US006300946B1

(12) United States Patent
Lincke et al.

(10) Patent No.: US 6,300,946 B1
(45) Date of Patent: *Oct. 9, 2001

(54) METHOD AND APPARATUS FOR INTERACTING WITH A PORTABLE COMPUTER

(75) Inventors: Scott D. Lincke, San Carlos; Joseph K. Sipher, Sunnyvale; Jeffrey C. Hawkins, Redwod City, all of CA (US)

(73) Assignee: Palm, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/087,742

(22) Filed: May 29, 1998

Related U.S. Application Data

(63) Continuation-in-part of application No. 08/790,518, filed on Jan. 29, 1997.

(51) Int. Cl.[7] .................................................. G06F 3/14
(52) U.S. Cl. ..................... 345/326; 345/156; 345/158; 345/184; 345/167; 345/169; 343/702
(58) Field of Search .................................. 345/156, 158, 345/184, 167, 168, 169; 343/702

(56) References Cited

U.S. PATENT DOCUMENTS

| | | | |
|---|---|---|---|
| 3,744,034 | 7/1973 | Paul | 340/172.5 |
| 4,860,372 | 8/1989 | Kuzunuki et al. | 382/13 |
| 4,972,496 | 11/1990 | Sklarew | 382/13 |

(List continued on next page.)

OTHER PUBLICATIONS

Gray R. Efficient MC68HCO8 Programming Dr. Dobb's Journal v20 n5, p70(5) Dialog File 275 01770262, 1995.*
Gray, R. et al., "Efficient MC68HC08 programming: reducing cycle count and improving code density", *Dr. Dobb's Journal,* vol. 20, No. 5, May 1995, pp. 70–75.
Ruley, J. et al., "Handheld–to–Handheld Combat", *Windows Magazine,* No. 811, p. 55, Nov. 1997.
Dayton, D., "FRx extends reporting power of Platinum Series", *PC Week,* vol. 8, No. 5, p. 29(2), Feb. 1991.
Forbes, J. et al., "Palm PCs get a Big Hand (What's Hot)", *Windows Magazine,* No. 905, p. 96, May 1998.

(List continued on next page.)

*Primary Examiner*—Raymond J. Bayerl
*Assistant Examiner*—Thomas T. Nguyen
(74) *Attorney, Agent, or Firm*—Van Mahamedi; Hickman Palermo Truong & Becker

(57) ABSTRACT

A portable computer system incorporates mechanical buttons that combine the task of powering-up the portable computer system and starting a particular computer application. The same mechanical buttons can be used to navigate the computer application to find the information that is most likely needed by the user. External computers can be coupled to the portable computer system in a manner that allows an external hardware device to initiate specific computer applications that cooperate with the external hardware device. Some embodiments of the portable computer system comprise an antenna for wireless communications with a base station. Wireless computer applications available in the portable computer system are activated by moving the antenna from a first position to a second position. Some embodiments of the invention provide a communication system comprising a portable computer system having such wireless application activation, and a base station. The base station has a transceiver adapted to exchange signals with the portable computer system. The portable computer system has a transceiver adapted to exchange signals with the base station.

26 Claims, 12 Drawing Sheets

U.S. PATENT DOCUMENTS

| | | | |
|---|---|---|---|
| 5,014,346 | | 5/1991 | Phillips et al. ............................ 455/89 |
| 5,218,704 | * | 6/1993 | Watts, Jr. ................................ 713/322 |
| 5,231,381 | | 7/1993 | Duwaer ................................. 340/712 |
| 5,305,394 | | 4/1994 | Tanaka .................................... 382/13 |
| 5,389,745 | | 2/1995 | Sakamoto ................................ 178/18 |
| 5,434,929 | | 7/1995 | Beernink et al. ..................... 382/187 |
| 5,442,633 | | 8/1995 | Perkins et al. ....................... 370/94.1 |
| 5,444,192 | | 8/1995 | Shetye et al. ............................ 178/18 |
| 5,452,371 | | 9/1995 | Bozinovic et al. ................... 382/187 |
| 5,465,401 | | 11/1995 | Thompson .............................. 455/89 |
| 5,475,847 | * | 12/1995 | Ikeda ..................................... 713/322 |
| 5,481,721 | | 1/1996 | Serlet et al. .......................... 395/700 |
| 5,508,709 | | 4/1996 | Krenz et al. .......................... 343/702 |
| 5,528,743 | | 6/1996 | Tou et al. .............................. 395/148 |
| 5,534,892 | | 7/1996 | Tagawa ................................. 345/173 |
| 5,557,288 | * | 9/1996 | Kato et al. ............................ 343/702 |
| 5,560,001 | * | 9/1996 | Kardach et al. ...................... 713/500 |
| 5,561,436 | | 10/1996 | Phillips ................................. 343/702 |
| 5,602,997 | * | 2/1997 | Carpenter et al. ................... 345/349 |
| 5,615,284 | | 3/1997 | Rhyne et al. ......................... 382/187 |
| 5,621,917 | | 4/1997 | Bozinovic et al. ................... 392/189 |
| 5,630,148 | | 5/1997 | Norris ................................... 395/750 |
| 5,673,322 | | 9/1997 | Pepe et al. .............................. 380/49 |
| 5,698,822 | | 12/1997 | Haneda et al. .......................... 178/18 |
| 5,742,668 | | 4/1998 | Pepe et al. .............................. 379/58 |
| 5,742,905 | | 4/1998 | Pepe et al. ............................ 455/461 |
| 5,815,820 | * | 9/1998 | Kiem et al. ........................... 343/702 |
| 5,835,061 | | 11/1998 | Stewart ................................. 342/457 |
| 5,841,901 | | 11/1998 | Arai et al. ............................. 382/187 |
| 5,900,875 | | 5/1999 | Haitani et al. ........................ 345/349 |
| 5,973,645 | * | 10/1999 | Zigler et al. .......................... 343/702 |
| 6,014,705 | * | 1/2000 | Koenck et al. ....................... 709/230 |

OTHER PUBLICATIONS

Penwarden, M., "More Muscle for HP's OmniBook", *Windows Magazine,* No. 501, p. 110, Jan. 1994.

Feigel, C., "IBM, Motorola preview embedded PowerPCs; 403 and 505 processors combine strong performance with low cost", *Microprocessor Report,* vol. 8, No. 6, pp. 1–5, May 1994.

Bursky, D., "Evolving DSP chips do more", *Electronic Design,* vol. 38, No. 23, pp. 51–59, Dec. 1990.

* cited by examiner

261

Address List   ▼ Business

Boyer, Monty      0181 680-7826 H
Butter, Andrea    0181 548-2277 W
Carter, Scott     01752 348-789 W
Colligan, Ed      0117 758-275 W Look Up:_____  [New]

FIGURE 2C

METHOD AND APPARATUS FOR INTERACTING WITH A PORTABLE COMPUTER

RELATIONSHIP TO COPENDING APPLICATION

This application is a continuation-in-part of "Method and Apparatus for Interacting with a Portable Computer System" application Ser. No. 08/790,518; Filed: Jan. 29, 1997; which is incorporated herein by reference.

BACKGROUND OF THE INVENTION

1. Field of the Invention

The invention relates to the field of portable computer systems. Specifically, the invention relates to a portable computer system that can be quickly turned on and that can access relevant information with a minimal user interaction.

2. Description of Related Art

Handheld computer systems are small compact computers that can fit within the palm of your hand. Handheld computer systems are usually used to provide personal information in such applications as an address book, a daily organizer and a to do list. User expectations have grown with the handheld computer technology developments, especially in terms of reducing the user interaction and wait time required for obtaining access to computer applications in the portable device.

Users of handheld computer systems want quick and simple access to the information stored in the handheld computer. Existing handheld computer systems often require the user to perform a number of steps to access the desired information. For example, to obtain information from a calendar date, a person may first need to turn the handheld computer system on. Some systems then require a "boot-up" time before the handheld computer system enters an operational state. After the handheld is on and ready, the person must then start the calendar application. Finally, the person must navigate the calendar application to locate the desired date. Although, those few steps may seem simple, such steps seem to be an unnecessary nuisance to a person that wants to quickly access the appropriate information. It would therefore be desirable to implement a handheld computer system that allows the user to very quickly access the required information.

Certain portable devices, such as pagers, provide users with information from data sources connected to wireless base stations. Two-way pagers communicating through such wireless base stations are now provided with stock quotes and news highlights. Handheld computer users increasingly rely on desktop access to Internet content when they have access to their desktop computers. However, as handheld computer users they also want access to such information even when their desktop computers are not available. These users want quick and simple access to information that is tailored to their dynamic and individual needs, even when they are not able to connect to the Internet using a desktop computer.

SUMMARY OF THE INVENTION

In some embodiments of the invention, a portable computer system has one or more mechanical buttons that combine the task of turning the portable computer system on and starting a particular computer application. Furthermore, the same mechanical buttons can be used to navigate the application to find the information that is most likely needed by the user. Additionally, external devices can be coupled to the portable computer system in a manner that allows the external hardware device to initiate specific computer applications that cooperate with the external hardware device.

Some embodiments of the invention have a wireless mode of operation and have a positionable antenna. In one embodiment of the invention, the portable computer system is designed so that certain movement of the antenna combines the tasks of powering-up the portable computer system, starting a particular computer application, and performing a base station coverage check. The operation of the positionable antenna is integrated with the operation of the mechanical buttons and information that resides within the portable computer system enabling the portable computer system to use the wireless services in a manner that conserves user cost and time.

One aspect of the invention is provided by a method of activating a first computer application in a portable computer system. The method comprises receiving a first signal which corresponds to a user input requesting execution of a first application. In response to receiving the first signal the portable computer system activates the first computer application.

A second aspect of the invention is provided by a portable computer system comprising a processor, a mechanism, and a computer application. The processor has a low power consumption sleep mode. The mechanism is adapted to transmit a first signal to the processor in response to a user input. The signal indicates that the user desires access to a first computer application. The signal awakes the processor from its sleep mode. The computer application is also activated by receipt of said first signal by the portable computer system.

A third aspect of the invention is provided by a method employing a portable computer system having an antenna positionable in a first position and a second position. User movement of the antenna from the first position to the second position generates a first (antenna interrupt) signal. The portable computer system receives the first signal and determines that the type of interrupt signal is an antenna movement interrupt and activates a first computer application.

A fourth aspect of the invention enhances the method of the third aspect whereby activating the first computer application further comprises activating a third (off-line base station coverage check) computer application. The off-line coverage check is adapted to determine whether wireless communications can occur between the portable computer system and a base station. The off-line coverage check is executed within the portable computer system and requires no communication with a base station. When the user indicates that all user inputs required for wireless communication with a base station are completed, a fourth (on-line base station coverage check) computer application is activated. The on-line coverage check is adapted to select a base station with which the portable computer system is to establish wireless communications.

A fifth aspect of the invention is provided by a wireless communications system comprising at least one base station and at least one portable computer system. Each base station comprises a transceiver adapted to send signals to at least one portable computer system and to receive signals transmitted from at least one portable computer system. Each base station also has a wireless interface adapted for coupling the transceiver to a base station processor. Each portable computer system comprises a processor and a transceiver. The transceiver is adapted to send signals to at least one base station and to receive signals transmitted from at least one base station. Each portable computer system also has a mechanism adapted to transmit a first signal to a processor in response to a user input. A first signal generated by the user indicates that the user desires access to a wireless computer application in the portable computer system. The processor has a sleep mode. When in its sleep mode, the processor awakens in response to the first signal. The wireless computer application is also activated by the receipt of the first signal by the portable computer system.

A sixth aspect of the invention is a method of continuous wireless communications using a portable computer system after an antenna movement towards the first position. The portable computer system has an antenna which is positionable in a first position and second position. The method comprises moving the antenna from the second position towards the first position, and returning to the antenna to the second position within a predetermined period of time. Returning the antenna to its second position within a predetermined period after inadvertent movement of the antenna away from the second position ensures that the wireless communication in not terminated. Therefore, needless repetition of computer program applications required for wireless communications access is avoided.

BRIEF DESCRIPTION OF THE DRAWINGS

The objects, features, and advantages of the various embodiments of the invention will be apparent from the following detailed description and drawings.

FIG. 2c illustrates a screen display for an address book application that is displaying a set of records under the "business" multi-functions category.

DETAILED DESCRIPTION

Methods and apparatus for implementing a handheld computer system that are well integrated with a personal computer system are disclosed. In the following description, for purposes of explanation, specific nomenclature is set forth to provide a thorough understanding. However, many of these specific details are not required to practice the invention.

For this patent application the following definitions will apply. A computer application is a computer program. A computer program is a series of instructions for the portable computer system.

Frequently, a first distinction is made between the computer operating system and computer applications, because the operating system runs in a kernel mode or a supervisor mode. Therefore, the operating system is generally hardware protected from user modification. On the other hand, computer applications run in a user mode, and no such hardware protection is generally provided for such computer applications.

For the purposes of this patent, this first distinction is not of any interest because the patent does not address hardware protection from user modification. However, a key distinguishing characteristic of the operating system is retained for this patent. This distinguishing characteristic is that the operating system, which generally provides services to each application, may execute at the same time as a separate application. On the other hand, for some embodiments of the invention, some user mode applications may not simultaneously execute.

A Portable Computer System With One-Touch Application Buttons

Figure 1:
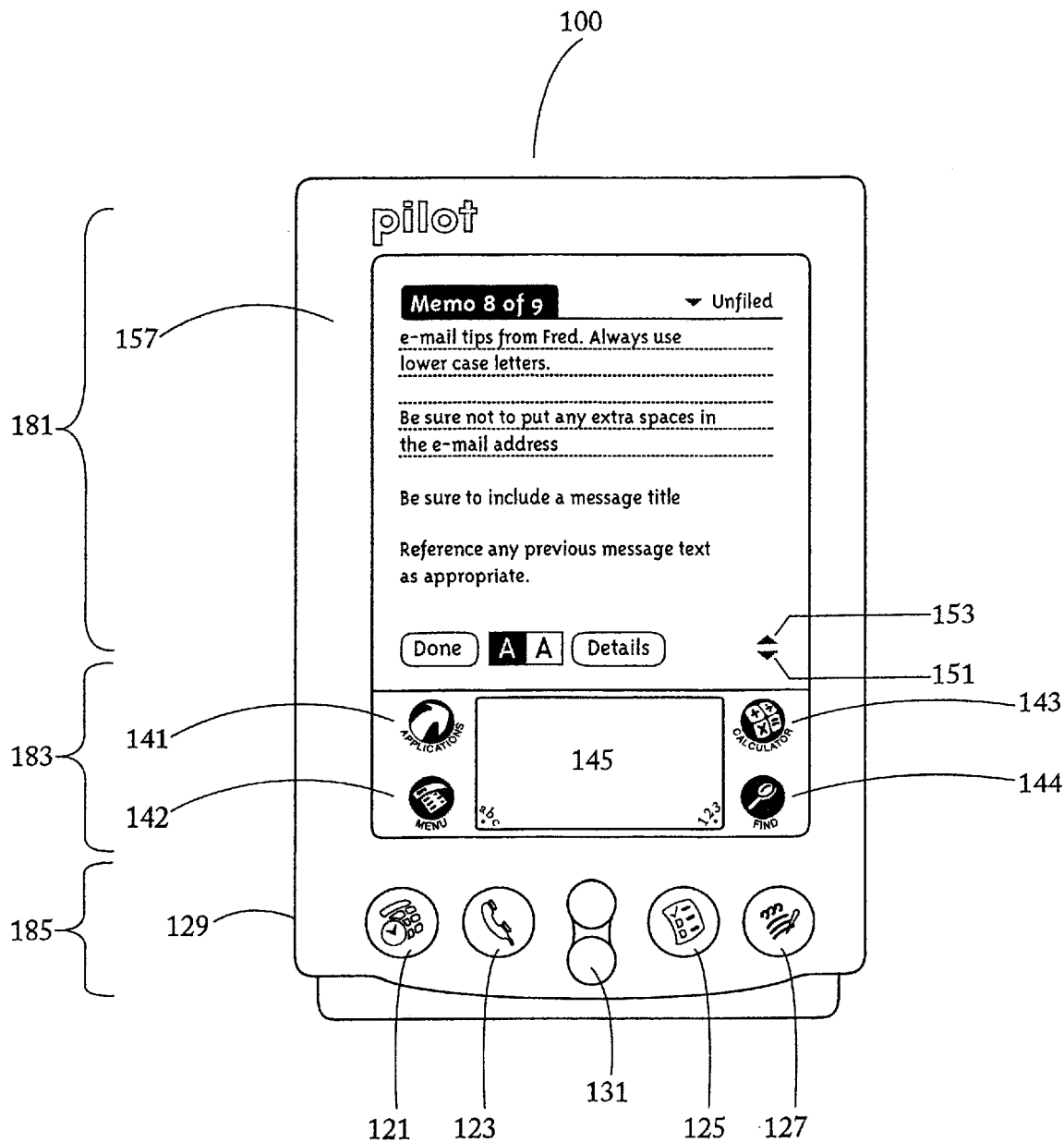
FIG. 1 illustrates a portable computer system with defined application buttons.

FIG. 1 illustrates an embodiment of a device, or more specifically a portable computer system 100, constructed according to the invention. Most of the front surface area of the portable computer system 100 comprises a screen display area 181. The screen display area 181 is used for displaying information to the user. The screen display area 181 is covered with a touch sensitive digitizer pad that can detect user interaction with a stylus or finger.

Below the display area 181 is a user input area 183. The user input area 183 is used to input text in the Graffiti® writing area 145 and interact with the screen-viewed application buttons 141 through 144. The user input area 183 is covered by the digitizer pad that will sense the user's finger or stylus.

Below the user input area 183 is a mechanical button input area 185. In the embodiment of FIG. 1 there are seven different mechanical buttons on the front of the portable computer system: a power button 129, two directional scrolling buttons 131, and four different application buttons 121, 123, 125 and 127.

The first mechanical button is a power button 129. If the portable computer system 100 is off, then the power button 129 turns on the portable computer system 100 and brings the portable computer system 100 to the state that the portable computer system 100 was in just before it powered down. Conversely, if the portable computer system 100 is on then pressing the power button 129 will save the current state of the portable computer system 100 and turn the portable computer system 100 off.

In general, the pair of scrolling buttons 131 are used to scroll information in the display area 181 up and down. The scrolling buttons 131 allow a user to view a list of information that does not fit on the display. In certain computer applications the scrolling buttons are adapted for more important functions. For example, in the calendar application, the scrolling buttons 131 change the screen display from one relevant time period (day, week or month) to the next adjacent time period e.g., from week 25 to week 26.

Figure 6:
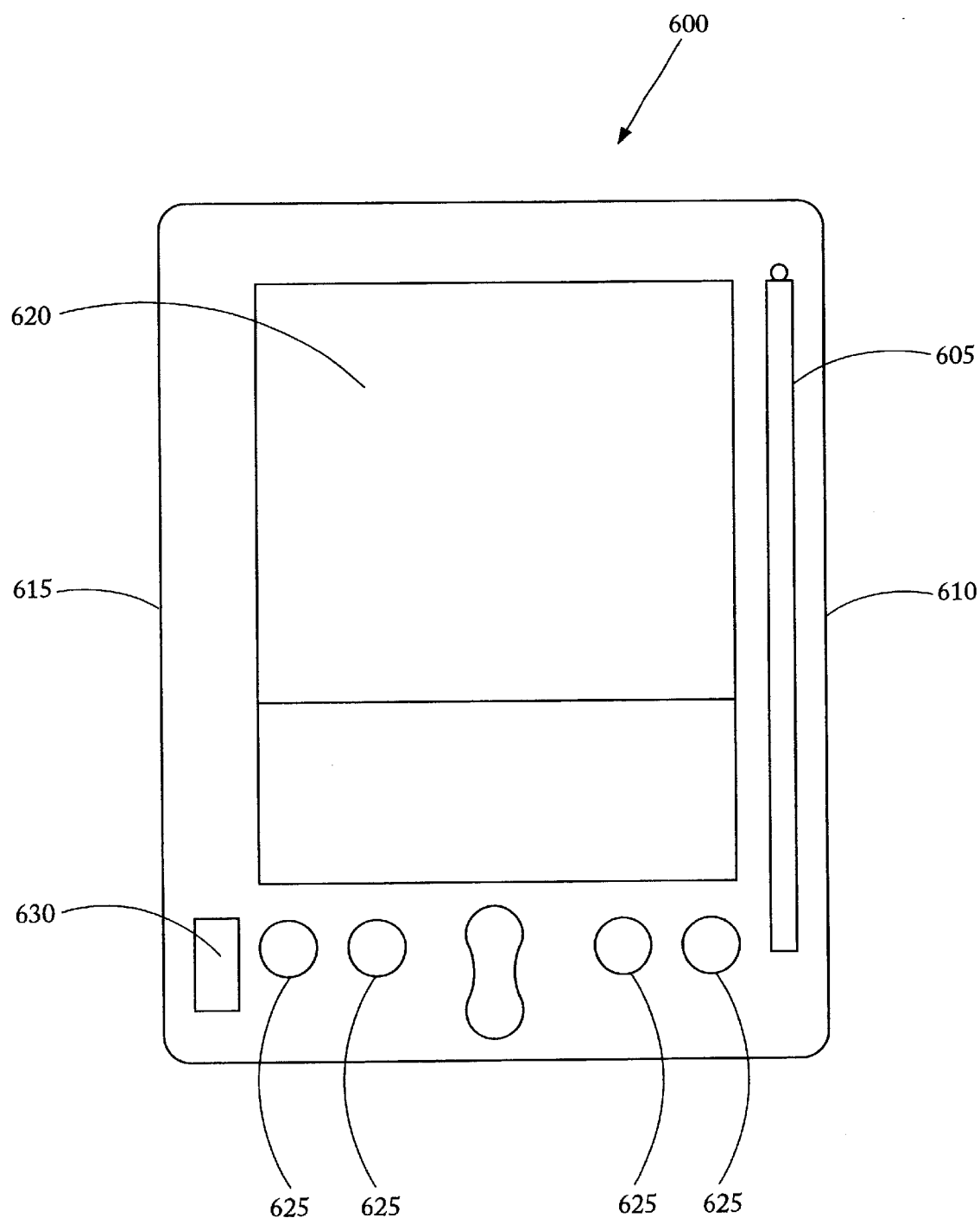
FIG. 6 illustrates a front view of a portable computer system with a positionable antenna in its first position.
Figure 7A:
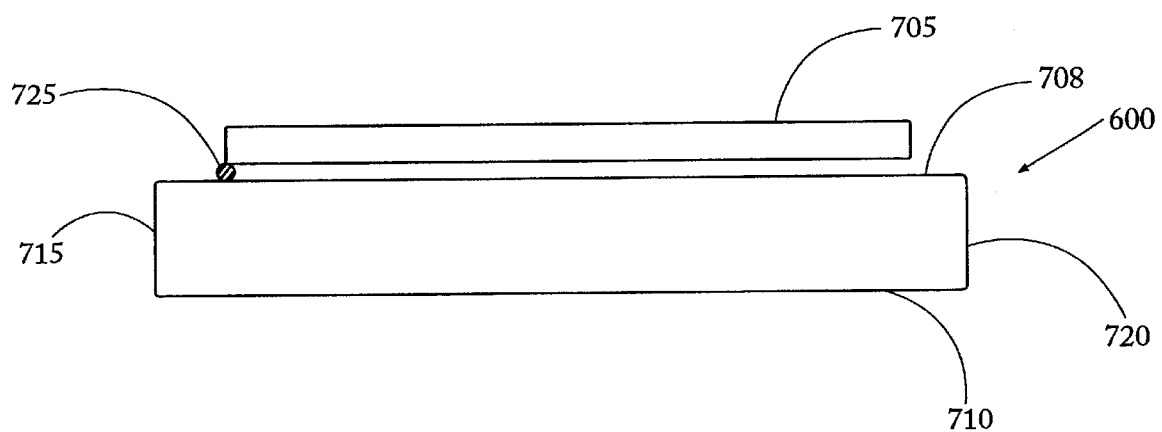
FIG. 7a illustrates a side view of a portable computer system with a positionable antenna in its first position.
Figure 7B:
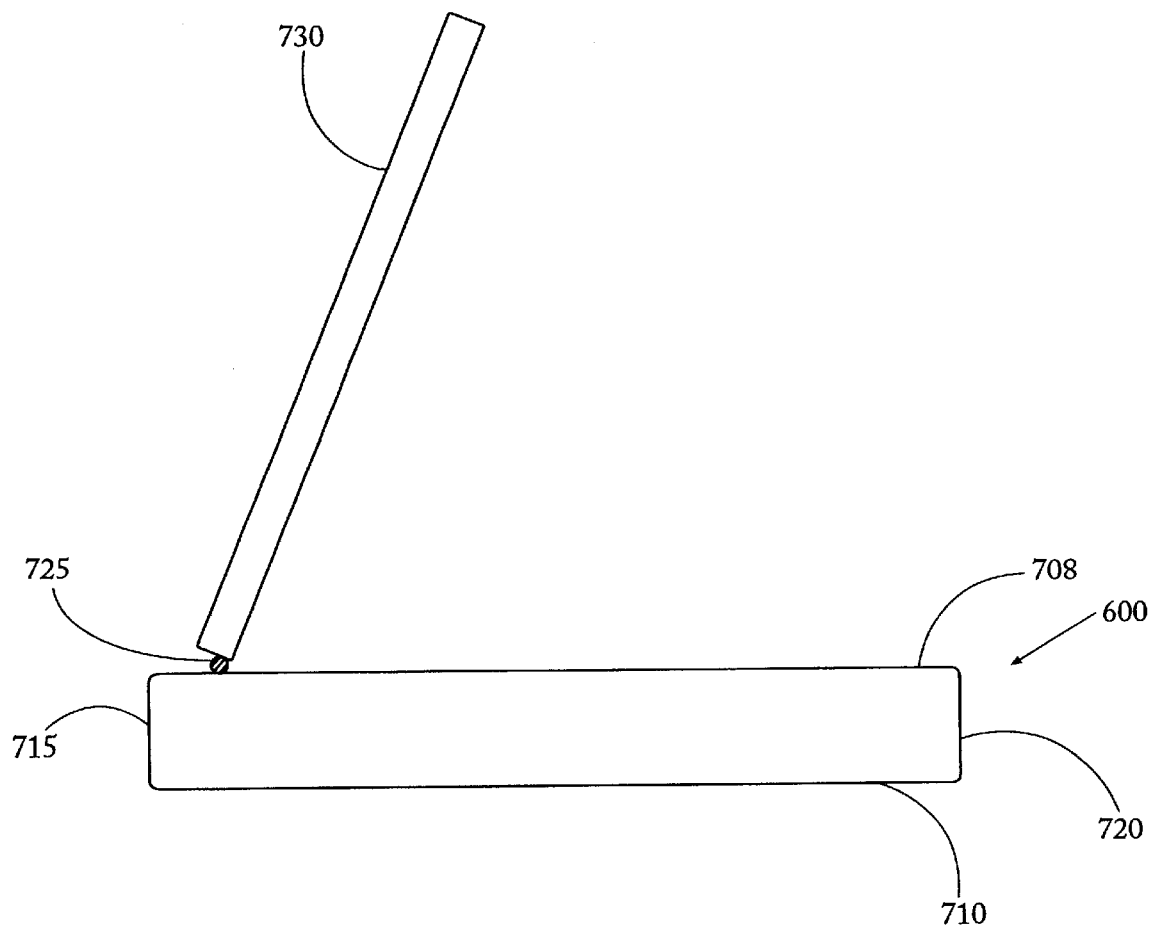
FIG. 7b illustrates a side view of a portable computer system with a positionable antenna in its second position.

An alternate embodiment of the portable computer system having wireless communication capability is shown in FIG. 6, FIG. 7a and FIG. 7b. A detailed discussion of this embodiment is provided below, starting with the section titled "Antenna-Up Wireless Activation". For this embodiment, if the portable computer system 600 is off, then movement of an antenna 605 from a first position 705 to a second position 730 turns on the portable computer system 600. One such movement of the antenna 605 is lifting the antenna up in a rotating motion away from the portable computer system as shown by comparing FIG. 7a with FIG. 7b.

There are four mechanical application buttons 121, 123, 125, and 127 illustrated in FIG. 1. In the embodiment of FIG. 1, application button 121 is used for a calendar application, application button 123 is used for an address book application, application button 125 is used for a to-do list application, and application button 127 is used for a note pad application. The embodiment of FIG. 1 provides just one possible set of applications. Other applications could be used instead of the applications illustrated in FIG. 1. Furthermore, the application buttons are programmable such that applications assigned to each application button may be changed.

When the portable computer system 100 is powered-off, the application function buttons 121, 123, 125 and 127 turn on the portable computer system 100 and then begin executing the associated application. For example, if the user presses the address book application button 123, the portable computer system 100 will turn on and begin executing the address book application. Thus, a method of activating a computer application in a portable computer system 100 is provided by the invention. The device has at least one computer application. The method comprises receiving a first signal (such as the signal generated by a user pressing an application button on the portable computer system), where the first signal corresponds to a user input requesting execution of a first application, and in response to receiving the first signal, activating the first application.

In some of the embodiments, the application buttons operate by generating a hardware interrupt signal to the processor in the portable computer system 100. The hardware interrupt signal wakes the processor in the portable computer system 100 from a sleep mode and causes the processor to execute code in a wake-up routine. In the wake-up routine, the processor checks a register to determine which application button was pressed. After determining which application button was pressed, the processor begins execution of the application corresponding to the pressed button. Therefore, when an application button is pressed, the result is that the corresponding application is activated because the device processor determines that the corresponding application is a predetermined application to be executed in response to receiving the signal generated by pressing the application button.

To further convenience the user, each application starts executing by entering a state that has been chosen to best provide the information the user may be seeking. Table 1 lists the current applications illustrated in FIG. 1 and the initial state that each application enters when the corresponding application button is pressed.

TABLE 1

| Application | Description of Initial state. |
| --- | --- |
| Calendar | Appointment list for the current day. |
| Address book | List of names and phone numbers for most recently accessed multi-function category. |
| To-Do | To-Do list of most recently accessed multi-function category. |
| Memo Pad | Current Memo being edited (if any) else current list of memos. |

Thus, each application button turns on the portable computer system 100, starts executing the corresponding application, and brings the corresponding application into an initial state that has been chosen to provide the most useful information. In some applications, the initial state can be set by the user such that the user can decide what state the application should enter when the corresponding application button has been pressed.

Multi-function Categories and Application Button Overloading

Figure 2A:
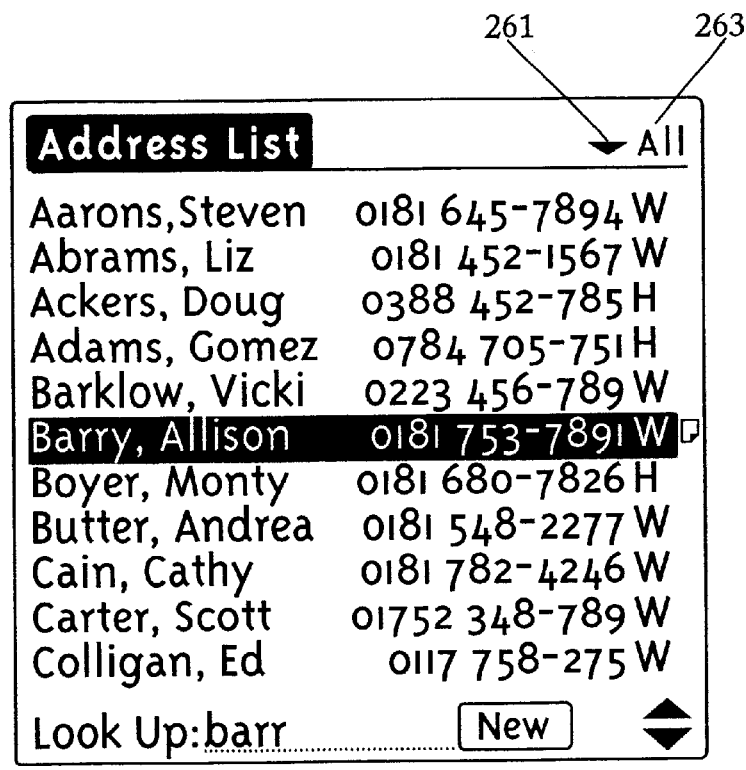
FIG. 2a illustrates a screen display for an address book application that divides records using multi-function categories.

As stated in the previous section, when the address book application button 123 is pressed, the portable computer system is turned on and the address book application starts executing. FIG. 2A provides an example of how the address book application may appear on the screen after the address book application button 123 has been pressed. In FIG. 2A there is a list of acquaintances of the user and associated telephone numbers. The user can select a particular acquaintance using a stylus or his finger. In FIG. 2A the acquaintance "Allison Barry" has been selected. If the user touches the selected Allison Barry again, a display screen containing additional information about Allison Barry will be presented.

Referring to the upper right corner of the address book screen display in FIG. 2A, there is a multifunction category name 263. In FIG. 2A, the multifunction category name 263 that is currently displayed is the "all" category. Each address book record is assigned to a particular multifunction category. By assigning each address book record to a multifunction category, certain acquaintances can be grouped together. For example, one multifunction category may be "personal" and that category would include close personal friends of the user. Another multifunction category may be "business" and that category would include business acquaintances of the user. The "all" displays all the address book records from all multifunction categories.

Figure 2B:
FIG. 2b illustrates a screen display for an address book application that is displaying a pop-up menu with the multifuction categories.

Next to the multifunction category name 263 is a multifunction category edit indicator 261. The multifunction category edit indicator 261 indicates that the user can select a particular multifunction category to display by selecting the multifunction category edit indicator 261. For example, FIG. 2B illustrates how the screen would appear after the user selects the multifunction category edit indicator 261. In FIG. 2B a list of the available multifunction categories is displayed. In the example of FIG. 2B, the available multifunction categories are "all" categories, "business" acquaintances, "personal" acquaintances and "unfiled" acquaintances. Furthermore, the user can add additional multifunction categories or edit the existing multifunction categories by selecting the "Edit categories . . . " list item from the pop-up menu.

An easier method of switching between the different multifunction categories exists. Specifically, the user can select between the various multifunction categories in the address book by continuing to press the address book application button after the address book application is executing. For example, referring to the address book display of FIG. 2A if the user again presses the address book application button 123, the address book application will move on to the multifunction category, the business category, as illustrated in FIG. 2C. By successively pressing the address book category, application button 123 the user can scroll through all the different multifunction categories. Alternatively, the user may continuously hold down the address book application button 123 and the address book application will slowly scroll through the different multifunction categories.

Different applications can perform different actions when their respective application button is pressed when the application is already running. Thus, each application button is "overloaded" in that the function that the key performs depends on the current context. Table 2 describes how each application behaves when the associated application button is pressed when the application is already running:

TABLE 2

| Application | Effect of pressing the Application button when the application is already running. |
|---|---|
| Calendar | Rotate the screen view from the day view to the week view, from the week view to the month view, and from the month view back to the day view. In a second embodiment, scroll through the appointment list for the current day. |
| Address book | Rotate through the different multifunction categories. |
| To-Do | Rotate through the different multifunction categories. |
| Memo Pad | Rotate through the different multifunction categories. |

In summary, if the portable computer system is off, each application button turns on the portable computer system 100 and begins executing the associated application. If a different application is running when a second application button is pressed, the application associated with the pressed second application button begins executing. However, if the application is already up and running and the application button for that application is pressed, then the application can perform a specific functions such as rotating through different multifunction categories as described in the example of FIGS. 2A and 2C.

Externally Accessible Application Signals

Figure 3:
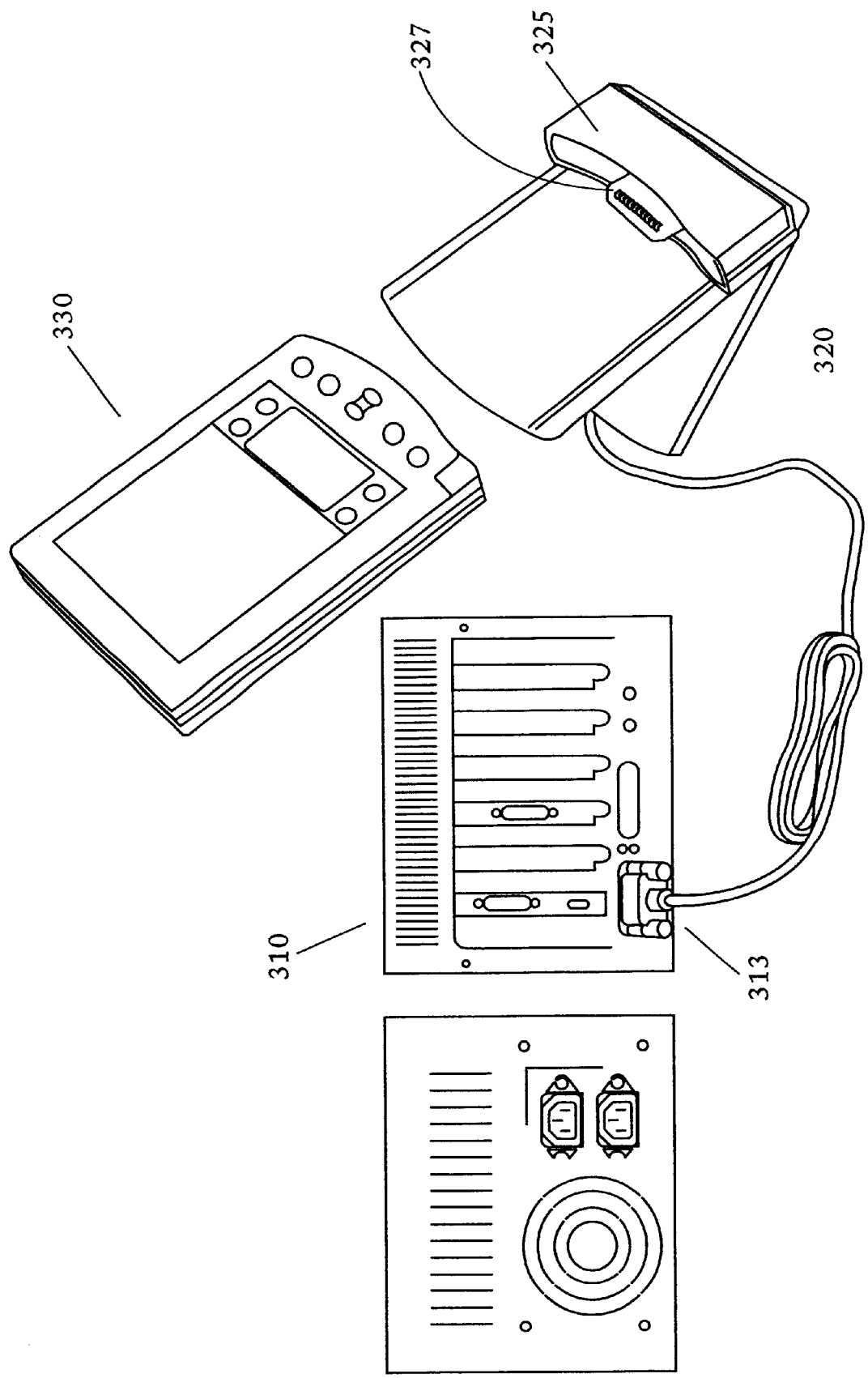
FIG. 3 illustrates a portable computer system and a personal computer system equipped with a cradle for synchronizing with the portable computer system.

FIG. 3 illustrates a portable computer system 330. The portable computer system 330 may execute a number of different applications. However, the most common applications on the portable computer system 330 will comprise a suite of Personal Information Management (PIM) applications such as the address book application, the calendar application, the to-do list application, and the memo pad application previously described. Most people that use a portable computer system 330, also have a personal computer system 310 that has the same or similar applications. It would therefore be desirable to synchronize information between the portable computer system 330 and the personal computer system 310. This would allow the user to edit the information while using the desktop personal computer system 310 at an office and edit the same information when using the portable computer system 330 while traveling.

Referring again to FIG. 3, a desktop personal computer system 310 is also illustrated. Coupled to the serial port 313 of the desktop personal computer system is a communication cradle 320. The communication cradle is used to provide a serial communication link between the portable computer system 330 and the personal computer system 310. Specifically, the serial communication lines from the serial port are extended and terminate at a serial interface connector 327 on the communication cradle 320. A matching serial interface connector (not shown) on the rear of the portable computer system 330 connects the portable computer system 330 to the personal computer system 310.

To synchronize the information on the portable computer system 330 with the information on the personal computer system 310, a user drops the portable computer system 330 into the communication cradle 320 and presses a synchronization button 325 on the communication cradle 320. The synchronization button 325 causes a synchronization program on the portable computer system 330 to execute. The synchronization program on the portable computer system 330 wakes up a peer synchronization program on the personal computer system 310. The synchronization program on the portable computer system 330 and the peer synchronization program on the personal computer system 310 perform the necessary operations to synchronize information stored on the two computer systems. The architecture of the synchronization process is described in the U.S. patent application entitled "Extendible Method and Apparatus for Synchronizing Multiple Files On Two Different Computer Systems" with Ser. No. 08/542,055, filed on Oct. 13, 1995.

The synchronization button 325 on the communication cradle 320 operates similarly to the application buttons on the personal computer system 310. Specifically, the synchronization button on the communication cradle asserts a hardware interrupt signal to the processor in the personal computer system. The interrupt routine determines that the synchronization button was pressed and thus starts executing the synchronization program on the portable computer system 330. Thus, the synchronization button uses an externally accessible version of the application buttons.

Figure 4:
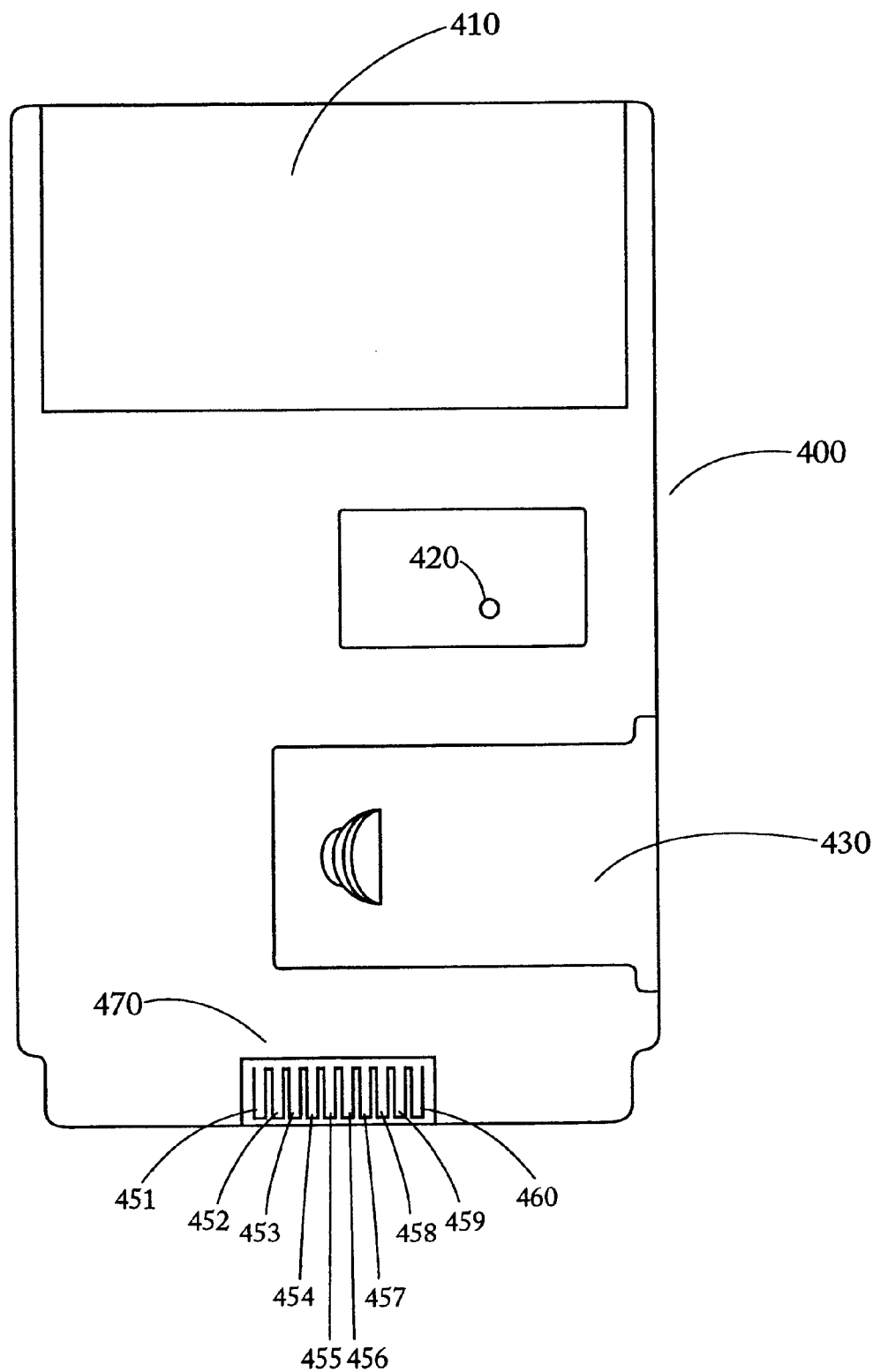
FIG. 4 illustrates the rear of a portable computer system with an interface for communicating with the synchronization cradle of FIG. 3.

FIG. 4 illustrates the rear panel of a portable computer system 400 for use in the communication cradle 320. Referring to the bottom of the portable computer system, a set of printed circuit board interface connectors 451 through 460 are illustrated. The printed circuit board interface connectors connect with a corresponding interface on the communication cradle. Table 3 lists the printed circuit board interface connectors in one embodiment of the portable computer system:

TABLE 3

| Ref. # | Description |
|---|---|
| 451 | Data Terminal Ready (DTR) [output] |
| 452 | Power output [output] |
| 453 | Serial Data Input (RXD) [input] |
| 454 | Ready To Send (RTS) [output] |
| 455 | Serial Data Output (TXD) [output] |
| 456 | Clear To Send (CTS) [input] |
| 457 | Hardware Interrupt Line [input] |
| 458 | General purpose data input [input] |
| 459 | Unused |
| 460 | Electrical Ground |

To assert a hardware interrupt signal to the processor in the portable computer system 400, the synchronization button 325 on the communication cradle 320 only needs to complete an electrical circuit between the power output connector 452 and the hardware interrupt line 457. The hardware interrupt line 457 is different from the hardware interrupt line used by the application buttons. The hardware interrupt line 457 can be used to perform other operations as well.

Figure 5:
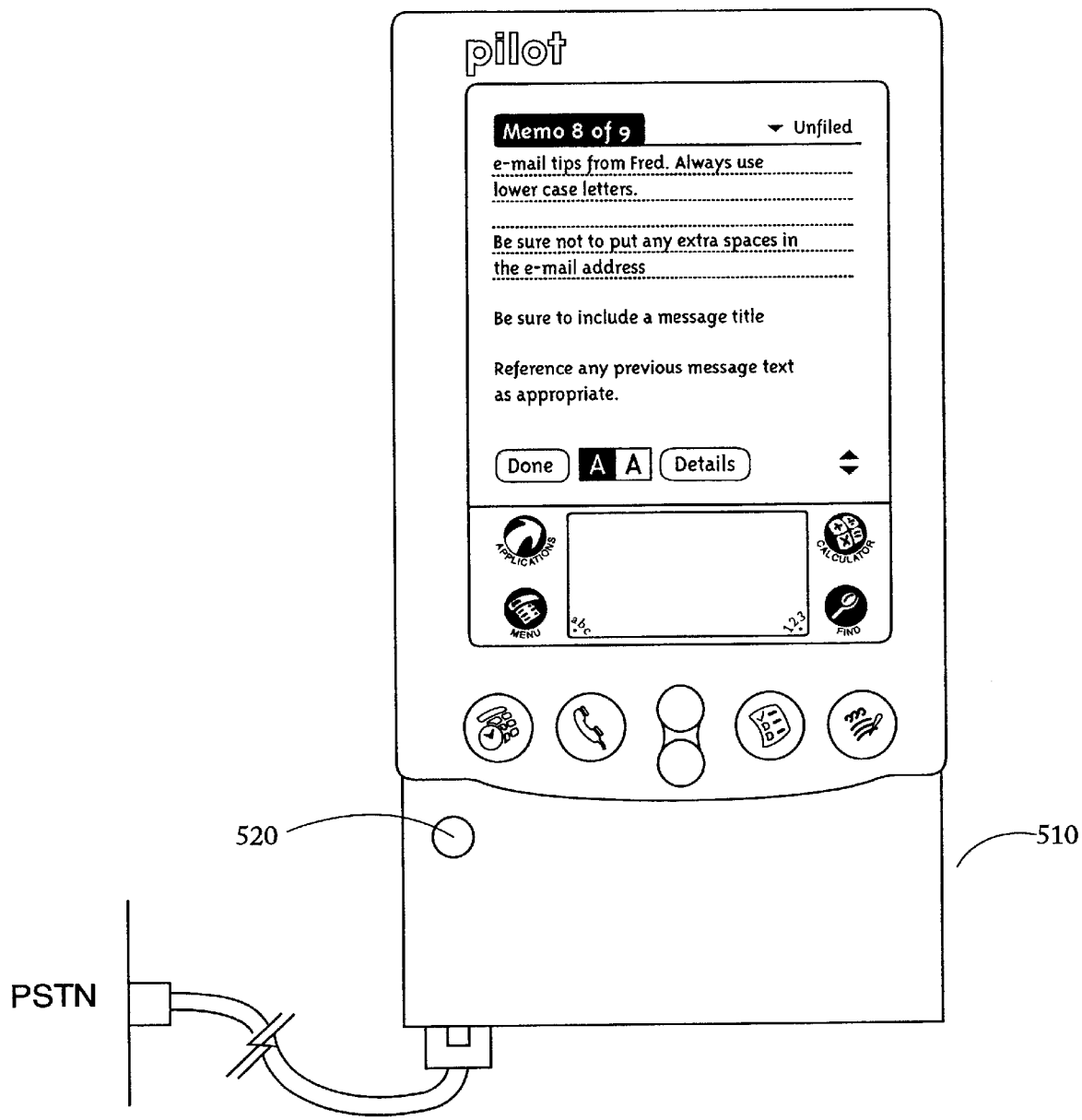
FIG. 5 illustrates a portable computer system equipped with a small modem for remotely synchronizing with a personal computer system.

FIG. 5 illustrates a portable computer system coupled to a clip-on modem 510. The clip-on modem includes a remote synchronization button 520 for remotely synchronizing with a companion personal computer. Since a remote synchronization through the clip-on modem is very different than a local synchronization through a communication cradle 320, the remote synchronization button needs to execute a different synchronization program or execute the same synchronization program with different input parameters.

To handle the remote synchronization, the remote synchronization button 520 can be wired to assert both the hardware interrupt line 457 and the General purpose data input 458. In such an embodiment, the interrupt service routine that handles a hardware interrupt associated with the hardware interrupt line 457 would first check the General purpose data input 458. If the General purpose data input 458 is not asserted, then a standard synchronization through the communication cradle 320 would be performed. However, if the General purpose data input 458 is asserted, then a special synchronization routine for handling remote synchronizations would be performed.

Antenna-Up Wireless Application Activation

One embodiment of the invention, as shown in FIG. 6, provides a portable computer system 600 having wireless communication capability. In the discussion that follows, wired computer applications are those which operate using data stored within the portable computer system 600. Wireless computer applications use data that accessed through wireless communications with a base station.

The portable computer system 600 has an antenna 605 and at least one application that has the capability to exchange data through communications with a base station. Examples of such applications include stock quotes and trading, electronic mail, entertainment guides, and automobile directions. This embodiment of the invention supports transmission of graphics over the wireless channel. However, wireless access to graphics is subject to expense, time and portable computer system bandwidth limitations. Transmission of graphics data over the wireless channel is enhanced through methods that properly manage the bandwidth limitations.

For users of a wireless service used in conjunction with the portable computer system 600, a wireless application in the portable computer system 600 is quickly activated with minimal user interaction. Similarly, data transmission through communications with a base station are quickly established with minimal user interaction.

Figure 8:
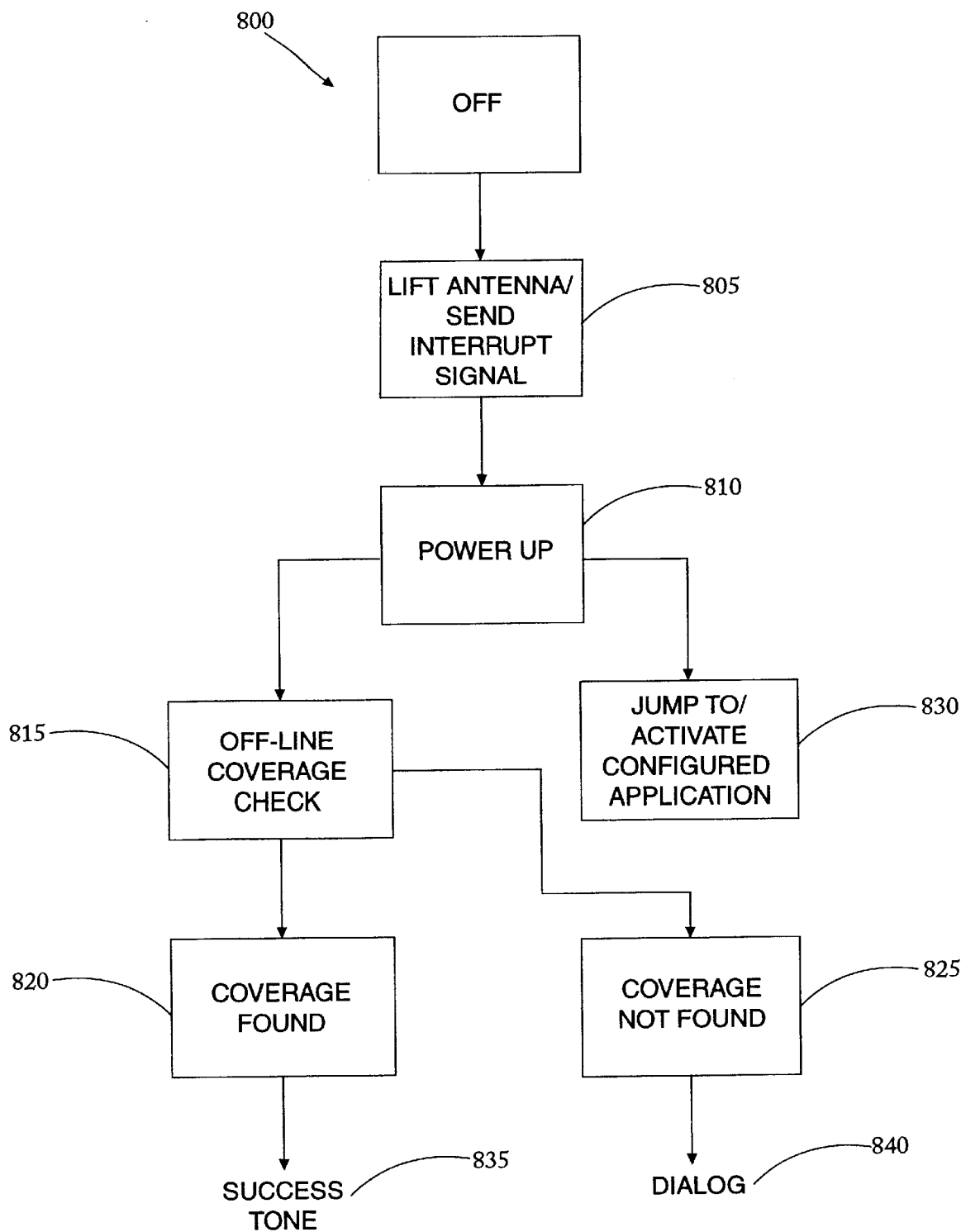
FIG. 8 illustrates a flow chart that describes the operation of a portable computer system for simplified access to wireless communication when the portable computer system is not powered-up at the time an antenna interrupt signal is received by the portable computer system.

The expeditious access to wireless applications is alternately referred to as either "antenna-up wireless activation" or "instant-on capability". The names refer to the device power-up and wireless application activation which occur with little user-perceptible delay. With reference to FIG. 8, which is discussed in greater detail below in the Processor Response to Antenna Interrupt sections of the specification, the powering-up 810 of the portable computer system 600 and wireless application activation 830 occur in response to a first signal 805. The first signal 805 corresponds to a user initiated indication that access to a wireless application is desired. For example, the user lifts the antenna. The first signal 805 is received by the portable computer system 600 processor as an interrupt signal.

For the embodiment shown in FIG. 7a and FIG. 7b, user movement of an antenna 605 from a first position 705 to a second position 730 generates the interrupt signal that is received by the portable computer system 600 processor. Note that the antenna 605 as shown in FIG. 6 is in the first position 705. More generally, the device power-up 810 and wireless application activation 830 occur in response to a first signal 805 generated in response to the user indication that wireless communication is desired.

The portable computer system 600 communicates through an accessible base station.

Antenna Location and Movement—Interrupt Signal

In the embodiment as shown in FIG. 6, FIG. 7a, and FIG. 7b the portable computer system has a front 705, a back 710, a top 715, a bottom 720, a right side 610, a left side 615, a housing, a display screen 620 disposed on the front of the portable computer system 600, a display screen cover (not shown) disposed over the display screen 620 in a first position of the cover, and an antenna 605 disposed to the right side 610 of the display screen cover. In some embodiments of the invention (not shown in the figures), the antenna is integral with the display screen cover. In the embodiment of FIG. 6, the antenna is disposed along the side of the display screen cover so that wireless operations are activated only when desired by the user.

For embodiments having an antenna that is integral with the display screen cover, wireless applications triggered by an interrupt signal generated by movement of the integral antenna are activated every time the portable computer system 600 is used. Wireless computer application activation occurs even when only wired computer applications are used, because the antenna is moved to the second position every time the screen cover is moved to reveal the display screen 620. If only wired computer applications are to be used, activation of any wireless computer applications results in wasted energy and user time. The problem is that the integral antenna is misplaced and triggers the antenna interrupt and related wireless computer application activations, when the user does not necessarily want to use wireless computer applications.

Placement of the antenna 605 to the side of the display screen cover allows the user to operate the portable computer system 600 in a "wired-only" mode. The wired mode is for situation where the user does not anticipate use of any wireless computer applications in the upcoming session. Wired-mode only activation can be accomplished by simply lifting up the screen cover, pressing one of the application buttons 625, or pressing a power button 630 when such an action results in the portable computer system 600 receiving an appropriate interrupt signal. With side placement of the antenna 605, lifting the screen cover does not result in the generation of a first (antenna-up interrupt) signal 805. If no interrupt signal is generated by lifting the screen cover, the user can still generate a wired mode interrupt signal by pressing an application button 625, or pressing the power button 630.

Note however, that for embodiments where the base station access time cost is not a factor, screen cover-up generation of a wireless-mode interrupt would eliminate the need for the user to lift the antenna 605 to generate the wireless mode interrupt signal, and thereby simplify user operation of the portable computer system 600. The portable computer system 600 is also operated to conserve battery life. The location of the antenna 605 to the side of the screen cover and the design choice to require pressing of an application button 625, or pressing of a power button 630, to initiate a wired-only mode of the portable computer system 600; reduce energy consumption and thereby prolong battery life. The location of the antenna 605 also reduces processor time spent on needless wireless operations, such as an off-line coverage check for available base stations discussed later in this section of the specification, when wired-only use of the portable computer system 600 is desired.

The antenna 605 may be disposed on either side of the screen cover. As shown in FIG. 6, the antenna 605 is disposed to the right side 610 of the screen cover. The display screen 620 lies in a plane perpendicular to a line drawn from the back 710 to the front 705 of the portable computer system 600. The display screen 620 is slightly recessed from the housing (157 on FIG. 1) of the portable computer system 600 and covers a majority of the surface area of the front 705 of the portable computer system 600.

In its first position 705, as shown in FIG. 7a, the antenna 605 lies flat in a plane parallel to the display screen 620. The antenna 605 is rotatable about an axis 725. The axis 725 comprises a line that runs from one side of the portable computer system 600 to its opposite side, the axis 725 is located near the top 715 of the portable computer system 600, and operates independently of the rotatable screen cover.

The first (antenna-up interrupt) signal 805 is generated by rotation of the antenna 605 from the first position 705 to a second position 730. The invention can function with a second position 730 such that the moving the antenna 605 through the angular separation between the first position 705 and the second position 730 is sufficient to trigger the first (antenna-up interrupt) signal 805. In some embodiments, the angular separation could be as small as a fraction of a degree. In other embodiments, movement of the antenna 605 through an angular separation of at least five degrees is sufficient to trigger the first (antenna-up interrupt) signal 805.

Comparing FIG. 7a with FIG. 7b, the second position 730 of the antenna 605 is approximately seventy degrees from the first position 705. This angular separation provides adequate assurance that an inadvertent antenna 605 movement will not generate the first (antenna-up interrupt) signal 805.

The probability of an inadvertent first (antenna-up interrupt) signal 805 can be reduced still further by allowing the user to deactivate the antenna-up feature. Such a deactivation would be particularly useful when other "secondary" users, such as children, have access to the portable computer system 600, and the primary user wants to ensure that wireless applications are not used by any secondary users. The deactivation would be accomplished by a second mechanism in the portable computer system 600 adapted to transmit a second (wireless function deactivation) signal to the processor. This could be done through the system's preferences computer application for the portable computer system 600. Only the primary user would have the password required to make changes to the system preferences. Therefore, only the primary user could enable or disable the second mechanism. The second (wireless function deactivation) signal overrides the normal response to the antenna 605 movement and ensures that no one can access wireless communications using the portable computer system 600, until the primary user disables the second mechanism.

In other embodiments (not shown), the antenna movement that triggers the first signal 805 comprises extending, or pulling, the antenna out from a first length to a second, longer length. In these embodiments the antenna comprises more than one segment where the first segment, having the largest diameter, is disposed closest to the portable computer device. Each succeeding segment that extends outwards from a previous segment has a progressively smaller diameter. The previous segment is disposed closer to the portable computer system. Each succeeding segment is slidable within the previous segment.

Processor Response to Antenna Interrupt—Portable Computer System Off Prior to Movement of Antenna FIG. 8 illustrates the portable computer system-off flow diagram 800, when the portable computer system 600 is not in use prior to receipt of the first (antenna-up interrupt) signal 805. When the processor is in the sleep mode, the first response of the portable computer system 600 to receipt of the first signal 805 is to power up 810 the portable computer system 600.

The first signal 805 is generated by the appropriate lifting, or rotation of an antenna 605 from a first position 705 to a second position 730. Analogous to the actions caused by pressing the power button 630 or pressing an application button 625 in the wired mode, powering up 810 the portable computer system 600 is accomplished by waking the processor from its power saving sleep mode and causing the processor to execute code in a wake-up routine.

Upon receiving the first (antenna-up interrupt) signal 805, the processor tests a register to determine that the first signal 805 is an antenna movement interrupt signal. The processor response to interrupts generated by pressing the power button 630, or an application button 625, differs from the response of the processor to an antenna-up interrupt first signal 805, so that only the antenna-up interrupt first signal 805 results in the processor executing the second response and the third response for wireless communications described in the next two paragraphs. During power-up, the launcher application checks the position of the antenna. If the antenna 605 is in the second position 730, a network library (NetLib) is opened in a wireless configuration. The NetLib is a collection of computer applications located in the portable computer system 600.

The second response of the portable computer system 600 to the first signal 805 is to evaluate whether the portable computer system 600 will be able to successfully communicate with a wireless base station, i.e., to determine whether any base station is available with which the portable computer system 600 can communicate using a wireless application. A third computer application 815, executed in the second response, is referred to as an off-line coverage check application. The third computer application 815 conserves battery life because only the portable computer system 600 radio receiver is used to determine whether wireless services are available. No transmission of information from the portable computer system 600 to the base station is required for the off-line coverage check third computer application 815. The portable computer system 600 radio receiver listens for base station signals and determines whether a base station which supports communication with the portable computer system 600 is transmitting a signal of sufficient strength to warrant further use of the wireless features of the portable computer system 600.

The third response of the portable computer system 600 to the first signal is to activate, or jump to, a properly configured wireless application 830 within the portable computer system 600. Typically, the wireless application activated in the third response to the first signal 805 is the wireless application launcher. In some embodiments, the wireless launcher computer application is a "wireless" category within a general launcher application. The wireless launcher application lists applications having wireless capability. The user can select the desired wireless application from the wireless launcher application.

If desired, the user may preselect a particular wireless application to be activated upon receipt of the first signal 805. Such a preselection is especially helpful for a user who favors one particular wireless application. The user configures which application is preselected by providing input into a preference database. The preference is stored in a database in the portable computer system. Upon receiving the first signal the preselected application is executed. The preselection of applications is also available for each of the mechanical buttons in the mechanical button input area 185. Each mechanical button has a corresponding default application when the user first powers up the portable computer system 100. The user can change the application corresponding to a particular application button by changing the preference in the database from the default application, for example the calendar application for application button 121, to another application of the user's choice.

The portable computer system 600 operating system is multi-threading, i.e., is capable of simultaneously executing different parts of an application called "threads". The determination of whether a base station is available takes place on a separate background thread in the operating system, while the application is running.

The execution of the third computer application 815, the off-line base station coverage check, typically takes a human perceptible amount of time (e.g., 2–10 seconds). However, normally there will be no perceived delay by the user, because the user is able to work with the wireless launcher or preselected application very quickly. The user typically selects the desired wireless application on a separate thread executed on the wireless launcher. Then, after the desired wireless application is activated from the launcher, the user enters information specifying what information is to be exchanged with the wireless base station on a separate user interface thread prior to requiring any communication with the base station. Thus, while the user is preparing data in the wireless application, the third (off-line coverage check) computer application 815 can be completed.

The third (off-line coverage check) computer application 815 performed in response to the movement of the antenna 605, does not initiate or maintain a connection with a base station. Instead, based on information resident in the portable computer system 600 regarding network base station operations, the third (off-line coverage check) computer application 815 determines whether or not a connection can be made to an appropriate base station.

The third (off-line coverage check) computer application 815 typically begins by evaluating whether communication access is available for base stations which have been successfully used by the portable computer system 600 in the recent past, or are otherwise indicated as preferred base stations by the user. The listing containing these base stations is relatively small and therefore the time required to complete a successful (i.e., coverage found) third (off-line coverage check) computer application 815 based on evaluation of the previously used station listing will be relatively quick.

However, if the evaluation of the preferred base station listing results in no base station coverage found, a more time consuming evaluation of a more comprehensive base station listing is done. Such a time consuming check is anticipated when the location is out of range of any of the preferred base stations.

In extreme circumstance, the off-line coverage check third computer application 815 may take more than several minutes due to processing of base station numbers that appear to be noise to the off-line coverage check third computer application 815 application. In such circumstances, the off-line coverage check third computer application program 815 delay will be apparent to the user because the user will complete preliminary use of the wireless application and be prepared to communicate with a base station before the off-line coverage check third computer program application 815 is complete. In some embodiments, a message indicating that the third computer application 815 has "timed out" will appear on the display of the portable computer system 600, indicating that no base coverage is available to the user.

According to the invention, if the off-line coverage check third computer program application 815 determines that base station coverage is available, i.e., coverage found 820, then a third signal is generated in the portable computer system 600 indicating that base station coverage is available. A success tone 835 is provided in response to the third signal indicating that the user should continue inputting data in the wireless application.

If, however, the off-line coverage check third computer application 815 determines that base station coverage is not available 825, a fourth signal is generated in the portable computer system 600 indicating that imminent communication with a wireless base station may be problematic. In response to the fourth signal, the user is provided with a dialog box 840 on the portable computer system 600 screen 620. The dialog box 840 allows the user to determine how to proceed. Dialog box 840 options could include: further preparation of the query script, return to a wired application, turning off the portable computer, HotSync™ connection of the portable computer system to update base station information, and other options apparent to a practitioner in the art.

An alternative embodiment provides the portable computer system with wireless communications capability in combination with a cellular phone. The cellular phone generally provides a communication device with much higher wireless communications bandwidth than the portable computer system by itself. In this embodiment, graphics and voice data would be more quickly and completely transmitted to the portable computer system, thereby enhancing the user experience. The advantages of performing the third (off-line coverage check) computer application would not be as striking for such a high bandwidth device.

Communications with Wireless Base Station

Initiation of contact with the base station occurs after the user has completed an appropriate request for information exchange with the base station, and indicated that the information packet is ready to be communicated to the base station. When the user indicates that immediate information exchange with the base station is desired, the executing wireless application triggers the performance of an "on-line" coverage check fourth computer program application. The fourth computer application polls candidate base stations, and then establishes communications with the appropriate available base station. Expeditious completion of the on-line coverage check fourth computer program application performed by the executing wireless computer application is greatly enabled by the information obtained from the off-line coverage check, third computer application 815.

The two-stage coverage check eliminates the need to transmit information to the base station until the user has completed the appropriate base station data exchange request. Thus, the two-stage coverage check reduces the base station to portable computer system 600 communication time. Reduction of such communication time reduces cost to the user, increases availability of the base station to other users, and conserves portable computer system 600 battery life.

Figure 9:
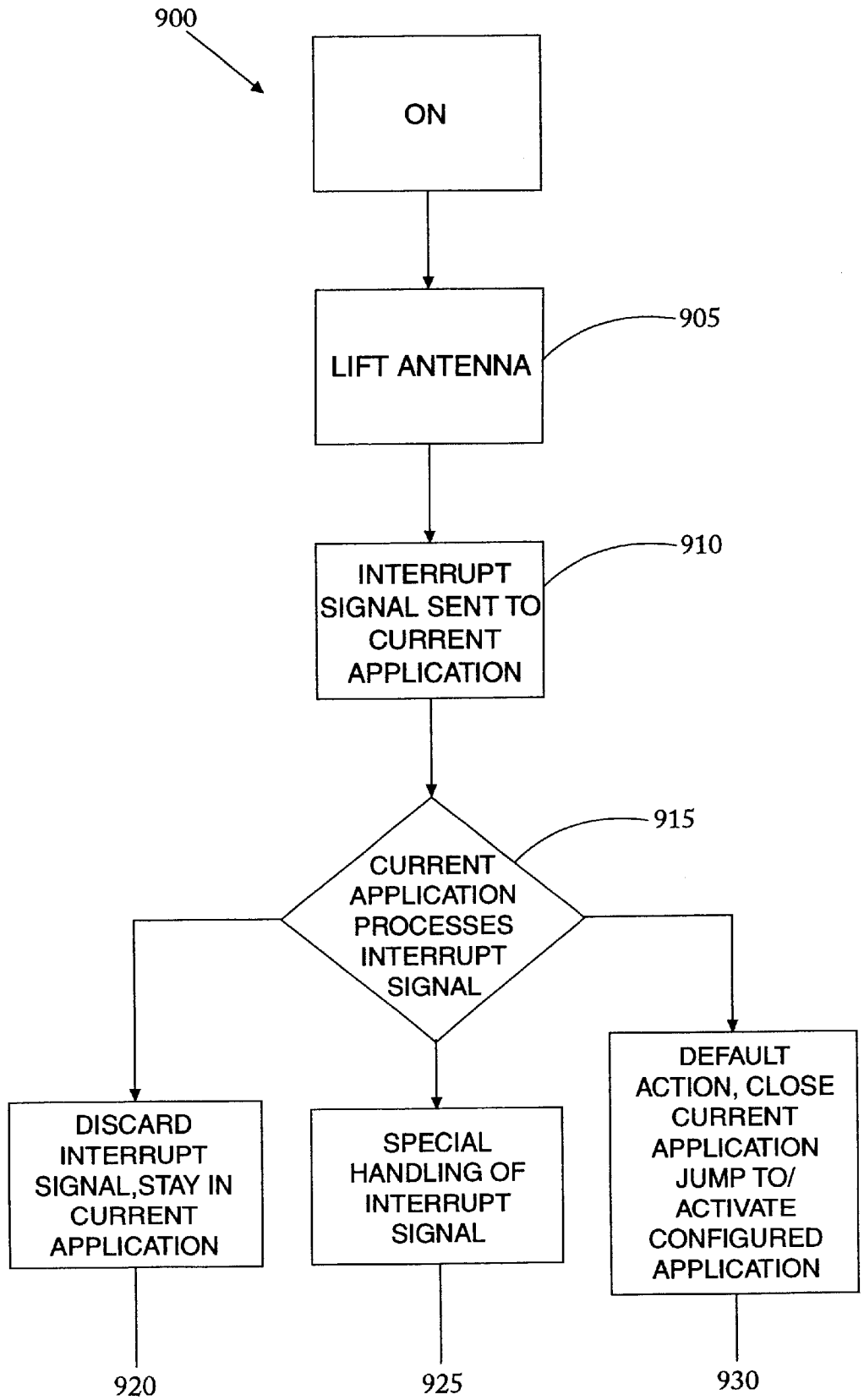
FIG. 9 illustrates a flow chart that describes the operation of a portable computer system for simplified access to wireless communication when an application is executing at the time an antenna interrupt signal is received by the portable computer system.

Processor Response to Antenna Interrupt—Portable Computer System In Use Prior to Movement of Antenna:

FIG. 9 illustrates the portable computer system 600 response when the portable computer system 600 is in use 900 when the appropriate movement of the antenna 905 occurs. If a wired second computer application is executing when the antenna 605 is lifted up, the executing second computer application receives a hard key code/antenna-up interrupt first signal 910. The executing second computer application then processes the first (antenna-up interrupt) signal response 915.

Typically, and as a default action if the second computer application has no predetermined antenna-up interrupt signal handling method, the second computer application will close in response to the first (antenna-up interrupt) signal 910. Upon closing, the second computer application will, in most cases, pass on the first (antenna-up interrupt) signal 910 to a processor. The processor then activates the wireless computer launcher (or a preselected wireless application) 930 so that the user can select the desired wireless application.

The closing second computer application saves its state at the time it is closed. Such state saving minimizes the delay associated with reopening the second computer application when it is next selected for execution. At its next opening, the second computer application is quickly restored back to the state it was in when terminated by the first (antenna-up interrupt) signal 910. In some embodiments, the second computer application also saves its end state screen as an image which helps restore the second computer application very quickly upon its reopening.

In certain circumstances, a wired second computer application can either ignore the first (antenna-up interrupt) signal 910, or continue executing and process the first (antenna-up interrupt) signal 910 within the second computer application. In the simplest of these circumstances, the second computer application simply discards the interrupt signal 920 and never deals with the signal again. In other situations, special handling 925 of the interrupt signal 910 within the second computer application may comprise opening up a dialog window. The dialog window could require the user to indicate whether the user desires to exit the second computer application and commence execution of a wireless application, or continue executing the wired application with subsequent prompts requesting the user to close or exit the wired application and commence execution of a wireless application.

Alternatively, a second computer application executing in a wired mode may have wireless capabilities and functions, i.e., a "dual mode" application. When a dual mode second computer application is executing in its wired mode, the second computer application will indicate to the portable computer system 600 operating system that the user wishes to continue using the second computer application, but now wants to execute the second computer application in its wireless mode. This is another example of special handling 925 of the first (antenna-up interrupt) signal 910. Many other special handling responses 925 may also be used in the invention.

The first (antenna-up interrupt) signal 805 generated by moving the antenna 605 to the second position 730 can provide a markedly different result for portable computer system 600 users who have not yet subscribed to the wireless service. Once the portable computer system 600 is powered up 810 in response to the antenna 605 movement, the portable computer system 600 operating system responds to the antenna-up interrupt first signal 805 by generating a wireless services activation prompt. This prompt requests such users to register for the service. Upon completion of the registration process, the portable computer system 600 will perform a third (off-line coverage check) third computer application 815 and provide the user with the wireless application launcher (default configured application) 830. Or, if the user has preselected a particular wireless application, the portable computer system 600 will instead execute the particular wireless configured application 830.

Continuous Wireless Communications

The invention also provides a method of continuous wireless communications using a portable computer system 600 where said portable computer system 600 has an antenna 605 positionable in a first position 705 and second position 730. The method comprises moving the antenna 605 from the second position 730 towards the first position 705, and returning the antenna 605 to the second position 730 within a predetermined period of time. As previously discussed, when the antenna 605 to the second position 730 the NetLib is in the wireless configuration. The NetLib has a close-wait state that maintains active radio coverage for a predetermined time after the NetLib has been closed by a computer application. This close-wait state enables the wireless launcher, or any other wireless application, to issue back to back NetLib open commands without incurring the expense of a coverage check.

The predetermined time is long enough so that if the user inadvertently moves the antenna 605 away from the second position 730, costly and time consuming wireless communication retries can be avoided if the user returns the antenna 605 to the second position 730 before the predetermined time has elapsed. The predetermined time may be selected by the user and will normally be in a range of a few seconds to a few minutes. Other embodiments use other periods of time. Note that, depending on the design selection made, termination of the wireless communication may occur when the antenna 605 is moved only slightly from the second position 730. A full return to the first position 705 may not be required to terminate wireless communications.

For some embodiments of the invention, the movement of the antenna 605 from the second position 730 and returning the antenna 605 to the second position 730 within a predetermined period of time results in continuous execution of a wireless application. For these embodiments, communications with the base station may continue if the antenna 605 is not returned to the second position 730 within the predetermined time, however, the executing wireless application will have to be activated again, typically through the wireless application launcher.

For some embodiments of the invention contact with the base station is maintained even with the antenna 605 returned from the second position 730 to the first position 705 even if the predetermined time has elapsed. Such embodiments are adapted for operations similar to pagers which receive information transmitted from a base station without specific user requests for such information.

Such embodiments, however, are not well suited for access to a fee for service operation where the fee is based on access time used. If user fees for the wireless portable computer system 600 in a receive only mode do not increase with access time, then maintaining receive only contact with the base station upon return of the antenna to its first position would be practicable. Information received in such a manner could include stock quotes, e-mail, base station availability updates, and other valued information that does not require a specific user request.

A Wireless Communications System

Figure 10:
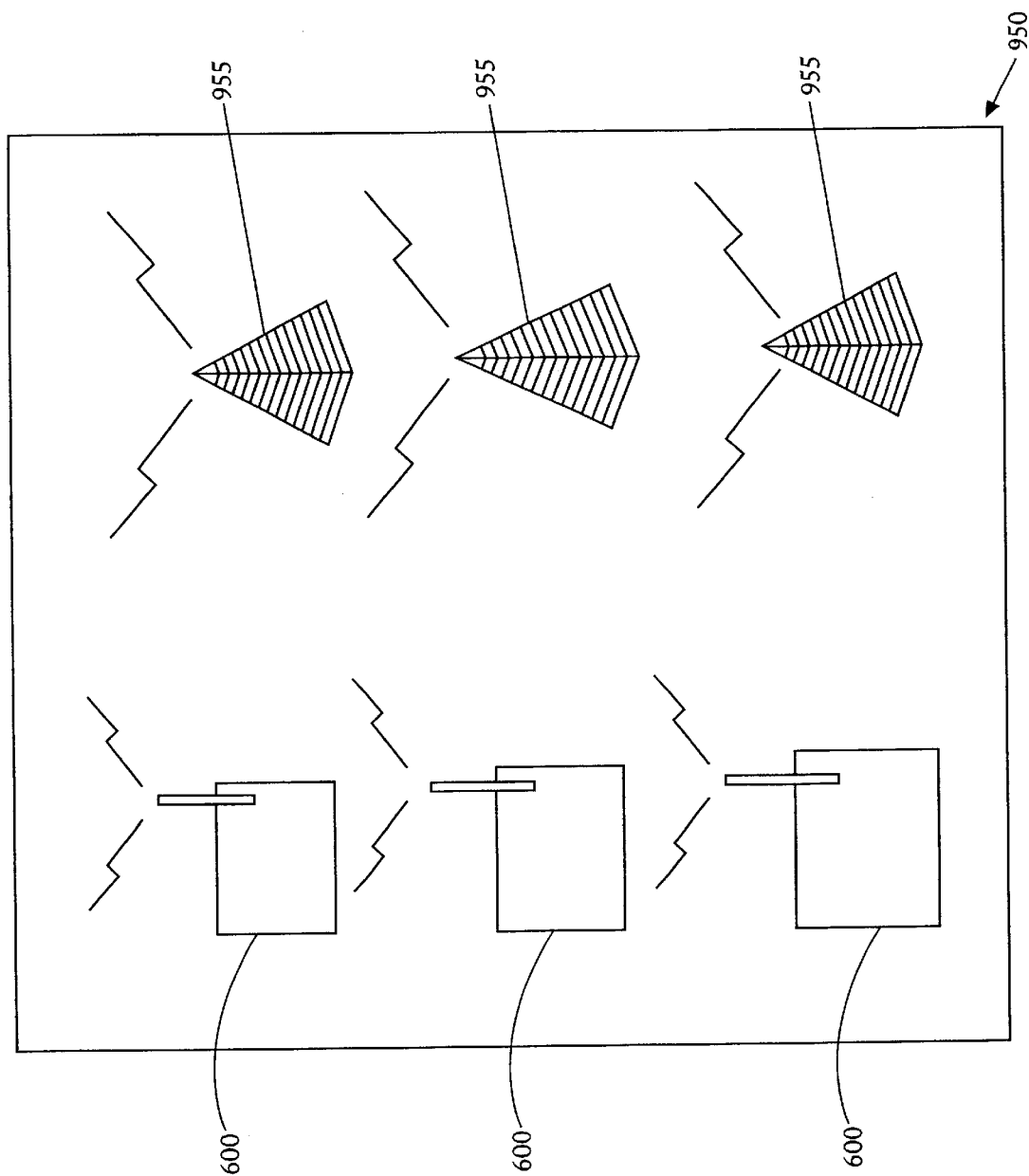
FIG. 10 illustrates the communication system comprising at least one portable communication system and at least one base station.

The invention is also shown in FIG. 10 as a wireless communications system 950 comprising at least one base station 955 and at least one portable computer system 600. The base station 955 comprises a transceiver adapted to wirelessly transmit to at least one portable computer system 600 and to receive transmissions from at least one portable computer system 600; and a wireless interface adapted for coupling said transceiver to a base station 955 processor. The base station 955 provides access to Internet content and other data sources of interest to the portable computer system 600 user.

The portable computer system 600 comprises a transceiver and a mechanism. The mechanism is adapted to transmit a first signal to a processor within the portable computer system 600 in response to a user input (such as a movement of an antenna). The transceiver is adapted to wirelessly transmit to at least one base station 955 and to receive wireless transmissions from at least one base station 955. The first signal indicates that said user desires access to a wireless computer application.

The processor has a low power consumption sleep mode and the first signal that awakes the processor from its sleep mode. The wireless computer application is activated by the portable computer system 600 receipt of the first signal. Transmissions to and from the portable computer system 600 are transmitted and received at a base station 955 antenna or other transmit/receive means.

In some embodiments, portable computer system 600 communication rates with the base station 955 range from two bits per second to twenty megabits per second (2 b/s–20 Mb/s). Preferred embodiments are adapted for communication rates in a range from two kilobits per second to one hundred kilobits per second (2 kb/s–100 kb/s). The wireless communications system 950 is operable for proprietary protocol systems adapted for low-bandwidth and high latency wireless data communications, including the RAM Network, Cellular Digital Packet Data (CDPD), and Ardis.

The wireless communications system 950 can also operate in a communications protocol based on an Open System Interconnection (OSI) network architecture model, a Transport Control Protocol/Internet Protocol (TCP/IP) network architecture model, or any other communication reference model.

Although the invention has been described in terms of specific exemplary embodiments, it will be appreciated that various modifications and alterations might be made by those skilled in the art without departing from the spirit and scope of the invention as set forth in the following claims.

What is claimed is:

1. A method of activating a computer application on a handheld computer, the handheld computer comprising a housing, a display accessible on the housing, and an antenna coupled to the housing to pivot from a first position adjacent to the housing to a second position away from the housing, the method comprising:

receiving a first signal corresponding to an antenna of the portable computer moving from a first position to a second position;

responsive to receiving the first signal, automatically activating a first computer application for wireless communications; and automatically configuring the display according to the first computer application being activated.

2. The method of claim 1, wherein activating the first computer application further comprises waking a processor in response to the first signal.

3. The method of claim 1, wherein activating the first computer application further comprises powering up the portable computer system if the portable computer system is not already powered on.

4. The method of claim 1, wherein the portable computer system has an operating system, and wherein activating the first computer application further comprises:

powering up the portable computer system if the portable computer system is not already powered on; and initializing the operating system.

5. The method of claim 1, wherein activating the first computer application further comprises powering up the portable computer system if the portable computer system is not already powered on, and powering up the portable computer system comprises waking a processor.

6. The method of claim 1, wherein activating the first computer application further comprises powering up the portable computer system if the portable computer system is not already powered on, powering up the portable computer system comprises waking a processor, and waking the processor comprises interrupting the processor such that the processor enters an interrupt service routine.

7. The method of claim 1, wherein activating the first computer application further comprises determining whether the first computer application is a predetermined application to be executed in response to receiving the first signal.

8. The method of claim 1, wherein a predetermined computer application is executed in response to receiving the first signal, the predetermined computer application being accessible through a user preference data base, the use preference data base indicating which computer application is a predetermined application to be executed in response to receiving the first signal; and wherein activating the first computer application further comprises performing a review of the use preference data base to determine which computer application is identified in the use preference data base as predetermined.

9. The method of claim 1, further comprising a second computer application prior to receiving the first signal so that the first signal interrupts the second computer application.

10. The method of claim 1, further comprising:

executing a second computer application prior to receiving the first signal; and responsive to the first signal, causing a message to be sent to the second computer application to cause the second computer application to determine a response to the first signal.

11. The method of claim 1, further comprising:

executing a second computer application prior to receiving the first signal; and determining a response of the second computer application to the first signal.

12. The method of claim 1, further comprising:

executing a second computer application prior to receiving the first signal the second computer application operable in a wired mode and a wireless mode, the second computer application operable in the wired mode prior to receiving the first signal;

responsive to the first signal, determining to operate the second computer application in the wireless mode.

13. The method of claim 1, further comprising:

signaling an interrupt in response to the first signal.

14. The method of claim 1, wherein receiving a first signal includes receiving an interrupt signal corresponding to the antenna moving from the first position to the second position.

15. The method of claim 1, wherein activating the first computer application further comprises:

powering up the portable computer system if the portable computer system is not already powered on, wherein powering up the portable computer system comprises waking a processor; and interrupting the processor such that the processor enters an interrupt service routine, and the interrupt service routine tests a register to determine that the first signal is an antenna movement interrupt signal.

16. The method of claim 9, further comprising activating a third computer application, the third computer application adapted to determine whether wireless communications can occur between the portable computer system and a base station.

17. The method of claim 9, further comprising:

responsive to the first signal, activating a third computer application adapted to determine whether wireless communications can occur between the portable computer system and a base station; then if the third computer application determines that wireless communication can occur, generating a third signal indicating that wireless communication can occur; and if the third computer application determines that wireless communications cannot occur, generating a fourth signal indicating that wireless communications cannot occur.

18. The method of claim 9, further comprising:

responsive to the first signal, activating a third computer application adapted to determine whether wireless communications can occur between the portable computer system and a base station; then the third computer application determines that wireless communication can occur, generating a third signal indicating that wireless communications can occur; and if the third computer application determines that wireles communications cannot occur, generating a fourth signal indicating that wireless communications cannot occur in response to the first signal; and responsive to the third signal, generating an audible tone.

19. The method of claim 9, further comprising:

responsive to the first signal, activating a third computer application adapted to determine whether wireless communications can occur between the portable computer system and a base station; then the third computer application determines that wireless communications can occur, generating a third signal indicating that wireless communications can occur; and if the third computer application determines that wireless communications cannot occur, generating a fourth signal indicating that wireless communications cannot occur in response to the first signal; and responsive to the fourth signal, generating a dialog window indicating that wireless communications cannot occur in response to the first signal and providing options for further use of the portable computer system.

20. The method of claim 9, further comprising:

responsive to the first signal, activating a third computer application adapted to determine whether wireless communications can occur between the portable computer system and a base station selected from a group of base stations; the third computer application executed within the portable computer system; and responsive to a user generated signal, activating a fourth computer application adapted to select a base station with which the portable computer system is to establish wireless communications.

21. A method of activating a computer application in a portable computer system, the portable computer system having a plurality of computer applications, a first computer application of the plurality of computer applications being primarily for wireless processing, a second computer application of the plurality of computer applications being primarily for wired processing, the method comprising:

receiving a first signal corresponding to an antenna moving from a first position to a second position; b responsive to receiving the first signal, automatically activating the first computer application;

receiving a second signal corresponding to an application button being pressed; and responsive to receiving the second signal, activating the second computer application.

22. The method of claim 21 further comprising bringing the first computer application into a state that has been chosen to best supply information being sought.

23. The method of claim 21, wherein the portable computer system has a plurality of application buttons, and receiving a second signal comprises detecting a first pressing of a first application button; and wherein:

activating the first computer application further comprises waking a processor in response to the first signal.

24. The method of claim 21 wherein accepting a second pressing of the application button after having begun execution of the first computer application; and responsive to accepting the second pressing of the application button, changing a state of the first computer application.

25. The method of claim 21 wherein activating the first computer application further comprises waking a processor in response to the first signal, the user input further comprises a first pressing of the application button, and wherein the method further comprises:

accepting a second pressing of the application button after having begun execution of the first computer application; and changing a state of the first application by accessing a different set of data.

26. The method of claim 23, wherein waking the processor in response to the first pressing of the first application button further comprises interrupting the processor such that the processor enters an interrupt service routine; the interrupt service routine testing a register to determine which application button of the plurality of application buttons has been pressed.

* * * * *